US00RE39727E

(19) United States
(12) Reissued Patent
Sprick et al.

(10) Patent Number: US RE39,727 E
(45) Date of Reissued Patent: Jul. 17, 2007

(54) DOUBLE SHELL DISPENSER

(75) Inventors: William D. Sprick, Evansville, IN (US); Christopher B. Clodfelter, Evansville, IN (US)

(73) Assignee: Rexam Medical Packaging Inc., Evansville, IN (US)

(21) Appl. No.: 10/738,700

(22) Filed: Dec. 17, 2003

Related U.S. Patent Documents

Reissue of:
(64) Patent No.: 6,543,650
Issued: Apr. 8, 2003
Appl. No.: 09/769,992
Filed: Jan. 25, 2001

(51) Int. Cl.
*B67D 5/33* (2006.01)

(52) U.S. Cl. ..... 222/153.14; 222/153.02; 222/153.04; 222/153.09; 222/521; 222/549

(58) Field of Classification Search ..... 222/153.02, 222/153.04, 153.09, 153.14, 519, 520, 521, 222/548, 549
See application file for complete search history.

(56) References Cited

U.S. PATENT DOCUMENTS 2,915,227 A * 12/1959 Quint ..... 222/519
3,175,741 A * 3/1965 Porter
3,406,880 A * 10/1968 Stull
3,407,967 A * 10/1968 Stull
3,784,060 A * 1/1974 Hazard ..... 222/153.14
4,065,037 A * 12/1977 Haller ..... 222/153.02
4,358,031 A * 11/1982 Lohrman
4,477,002 A * 10/1984 Stull ..... 222/520
4,867,354 A * 9/1989 Schreiber ..... 222/521
5,111,977 A * 5/1992 Maguire et al.
5,186,369 A * 2/1993 Aguirrezabal ..... 222/519
5,199,605 A * 4/1993 Schneider
5,310,097 A * 5/1994 Leuenberger ..... 222/521
5,421,487 A * 6/1995 Moretti ..... 222/153.1
5,505,346 A * 4/1996 Smith
5,636,470 A * 6/1997 Blomquist
5,915,576 A * 6/1999 Robinson ..... 215/216
6,065,648 A * 5/2000 Tauber ..... 222/153.14

FOREIGN PATENT DOCUMENTS

EP 0 558 273 A1 * 2/1993

* cited by examiner

*Primary Examiner*—Joseph A. Kaufman
(74) *Attorney, Agent, or Firm*—John F. Salazar; Middleton Reutlinger

(57) ABSTRACT

A dispenser closure is provided having a stopping mechanism that limits the rotation of the closure and generally prevents removal of the closure cap from the container. The dispenser closure includes a cap body, fitment and container finish. The cap body has a double shell design, which includes at least one drop lug projecting from the inner shell. When the cap body is rotated about the container finish, the drop lug engages at least one lug stop located on the container finish so as to limit the rotation, thereby preventing removal of the cap body from the container finish.

10 Claims, 7 Drawing Sheets

DOUBLE SHELL DISPENSER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to dispenser closures. More particularly, the present invention relates to threadably movable dispenser closures with stopping mechanisms.

2. Discussion of the Prior Art

Dispenser closures that open by the axial movement of a cap along a container finish are generally known in the art. Such a closure commonly includes a cap portion that is threadably attached to the finish of a container in such a way that the cap may be threadably moved from a closed position to an open position so as to access the contents of the container. The cap of this type of closure commonly has a limited range of rotation, so that the cap may remain affixed to the container even while in the open position.

SUMMARY OF THE INVENTION

It is an object of the present invention to provide a closure having a dispensing feature.

It is another object of the present invention to provide a double shell dispenser closure having a stopping mechanism which limits the range of rotation of a closure cap about a container finish.

More particularly, the apparatus of the present invention includes a double shell closure having a dispensing mechanism. The dispenser closure includes a cap body that is threadably attached to a container finish and a fitment placed in an aperture of the container and operably disposed between the cap body and the container finish. The container finish includes a neck portion with an opening therein, at least one thread and at least one lug stop thereon. The fitment has a plurality of spokes that connect an annular side wall with a post that is concentrically aligned therein. The cap body includes an inner wall and an outer wall concentrically aligned. In one embodiment, both the inner wall and the outer wall are annular and are concentrically aligned with an opening in a top wall of the cap body. The inner wall may include at least one thread on an inner surface thereof. The inner wall also has at least one drop lug projecting from a lower portion thereof. In one embodiment, two drop lugs are diametrically aligned and project downwardly from the terminating edge of the annular inner wall. The drop lugs are positioned to engage the lug stops located on the container finish, so as to prevent the threadable removal of the cap body from the container finish. The double shell dispenser closure may be partially opened to allow dispensing of the contents of the container, but may not be removed from the container due to the stopping mechanism.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figure 1:
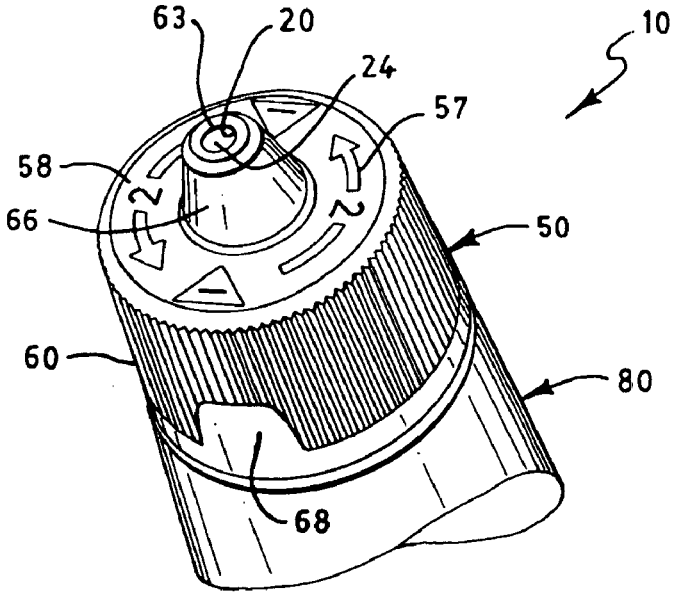
FIG. 1 is a perspective view of a preferred embodiment of the closure of the present invention.

As shown in the FIGS. 1-13, a closure of the present invention is provided having a dispensing feature with a stopping mechanism which facilitates the dispensing of the contents of a tube, bottle or similar container, but prevents removal of the closure from the container. Closure 10 may be formed of any material well known in the art, such as polypropylene and polyethylene. As shown in FIG. 1, the closure 10 includes a cap body 50, a fitment 20 and a container finish 80. The cap body 50 is threadably attached to the container finish 80, so that the cap body 50 may threadably rotate axially along the neck portion 82 of the container finish 80. In this manner, the cap body 50 may be rotated from a closed position to an open position in order to access the contents of the container (not shown) upon which the container finish 80 is disposed. The fitment 20 is positioned within closure 10 so that the opening 63 in the spout portion 66 of the cap body 50 is sealed by the post 24 of the fitment 20, when the cap body 50 is in the closed position. The present invention also provides a stopping mechanism by which the rotation of cap body 50 about container finish 80 is limited. This stopping mechanism prevents the threadable removal of the cap body 50 from the container finish 80.

Figure 2:
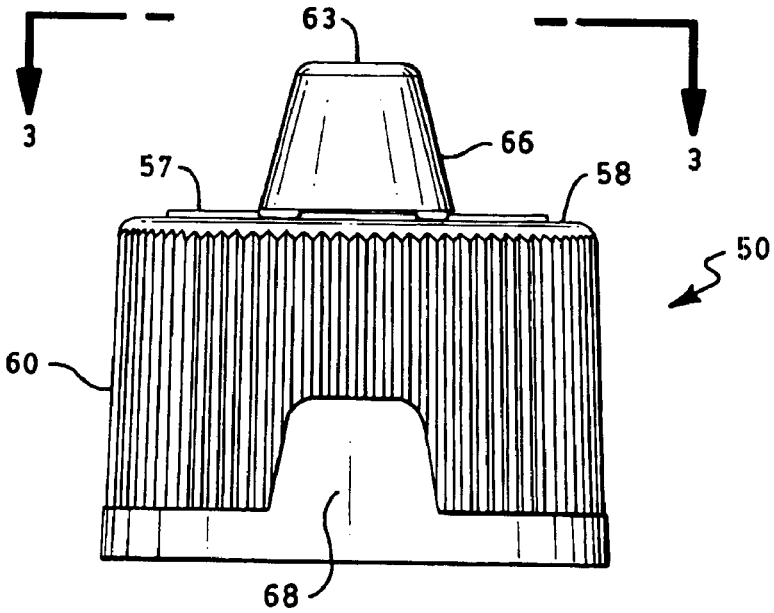
FIG. 2 is a side view of the cap body of the closure of FIG. 1.
Figure 3:
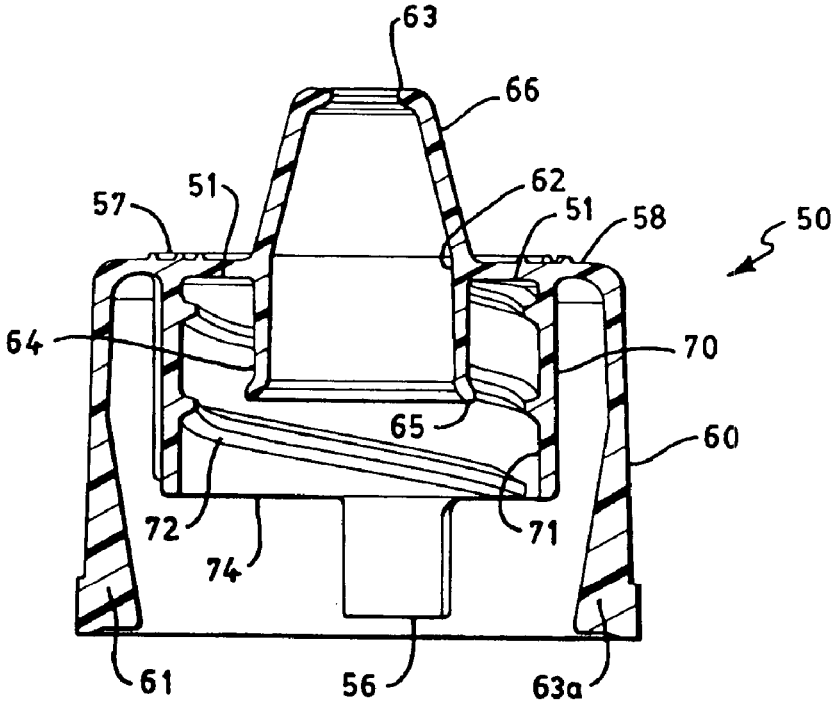
FIG. 3 is a sectional view of the cap body of FIG. 2 taken along line 2-2.
Figure 5:
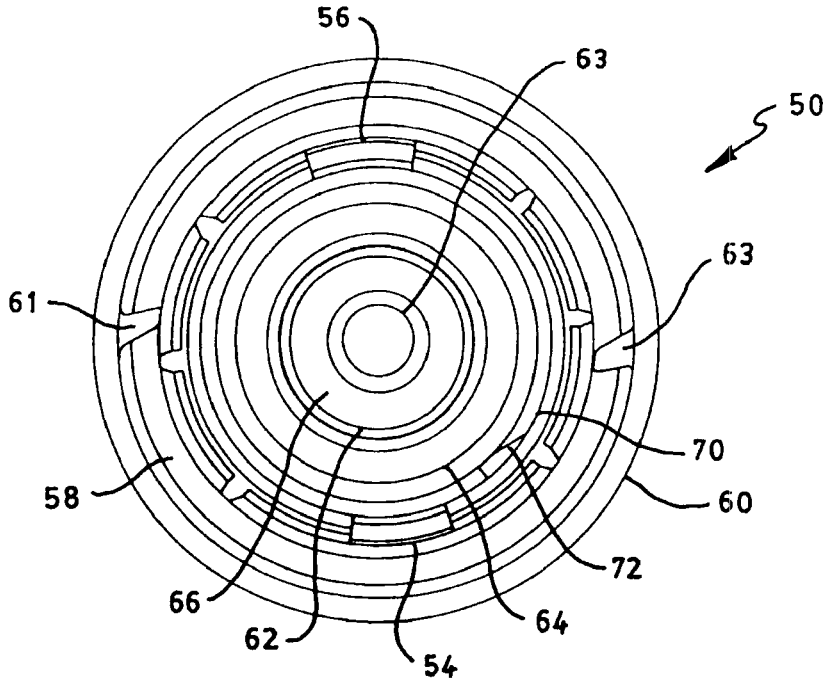
FIG. 5 is a bottom view of the cap body of FIG. 2.

As shown in FIG. 2, the cap body 50 includes an outer shell or wall 60 depending from a top wall 58 from which projects a spout portion 66. Spout portion 66 includes an opening 63 from which the contents of a container (not shown) may be dispensed. As shown in FIG. 3, cap body 50 includes an inner shell or wall 70, in addition to outer wall 60. Outer wall 60 may be annular or any other appropriate shape. Inner wall 70 is also annular and may include at least one thread 72 projecting from an inner surface 71 thereof. The stopping mechanism of the present invention includes at least one drop lug 56 formed on a lower portion or termination edge 74 of inner wall 70. In a preferred embodiment, inner wall 70 includes two drop lugs 54 and 56 projecting downwardly therefrom. As shown in FIG. 5, drop lugs 54 and 56 are diametrically disposed along the terminating edge 74 of inner wall 70. However, the drop lugs of the present invention may be disposed in any alignment in which the rotation of cap body 50 is usefully limited. As shown in FIG. 3, drop lug 56 is generally rectangular, although other shapes are contemplated by the present invention. However, when drop lug 56 meets lug stop 90 or 92 on container finish 80 as discussed herein below, the shape of drop lug 56 and the extent of its attachment to inner wall 70 should be sufficient to oppose twisting force applied by the user. Drop lug 56 is formed so as to resist deformation as rotational pressure is applied to cap body 50. As shown in FIG. 3, drop lug 56 may have an untapered connection with the terminating edge 74 of inner wall 70. The extent of the untapered connection between drop lug 56 and inner wall 74, as well as the overall width of the drop lug 56, imparts to drop lug 56 sufficient rigidity to resist deformation as rotating pressure is applied to cap body 50. Drop lug 56 engages lug stop 90 on container finish 80, when the closure 10 is rotated counterclockwise, so as to prevent rotation of cap body 50, as described herein below.

Figure 4:
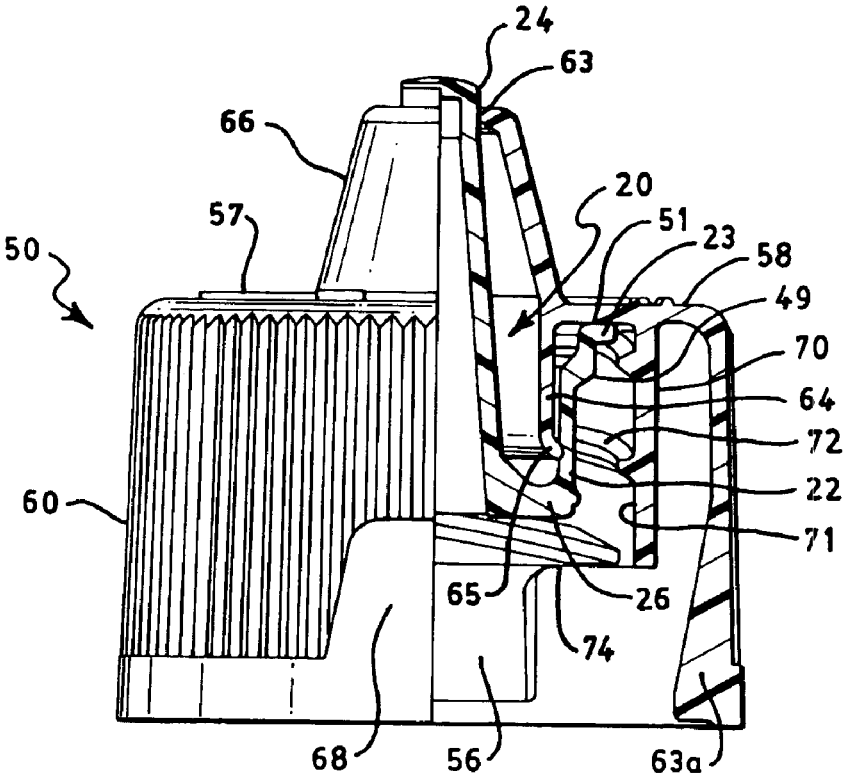
FIG. 4 is a side view of the cap body and fitment of the present invention with portions cut away.

As shown in FIGS. 3 and 4, outer wall 60 may include at least one child-resistant lock 63 formed thereon. In a preferred embodiment, as shown in FIGS. 3 and 5, cap body 50 includes two child-resistant locks 61 and 63a diametrically aligned along the outer wall 60 Cap body 50 also includes a top wall 58 from which both inner wall 70 and outer wall 60 depend. Top wall 58 includes an opening 62 disposed therein. A spout portion 66 projects from top wall 58 and is concentrically aligned with opening 62. Indeed, inner wall 70 and outer wall 60 are also concentrically aligned with opening 62. In one embodiment, as shown in FIGS. 3 and 4, cap body 50 includes a skirt 64 depending from top wall 58 flush with opening 62. Skirt 64 is provided within the cap body so as to operably engage an annular wall 22 of fitment 20, as shown in FIG. 4. In one embodiment, skirt 64 includes a skirt sealing head 65 which engages annular wall 22. By this engagement, the contents of the container (not shown), to which the closure 10 is attached, are prevented from contacting inner wall 70.

Figure 6:
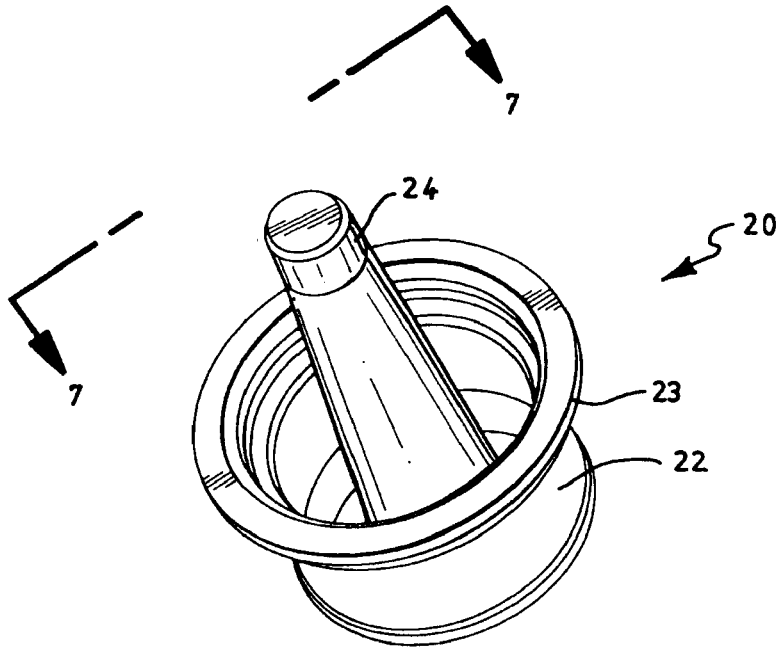
FIG. 6 is a perspective view of the fitment of the closure of the present invention.
Figure 7:
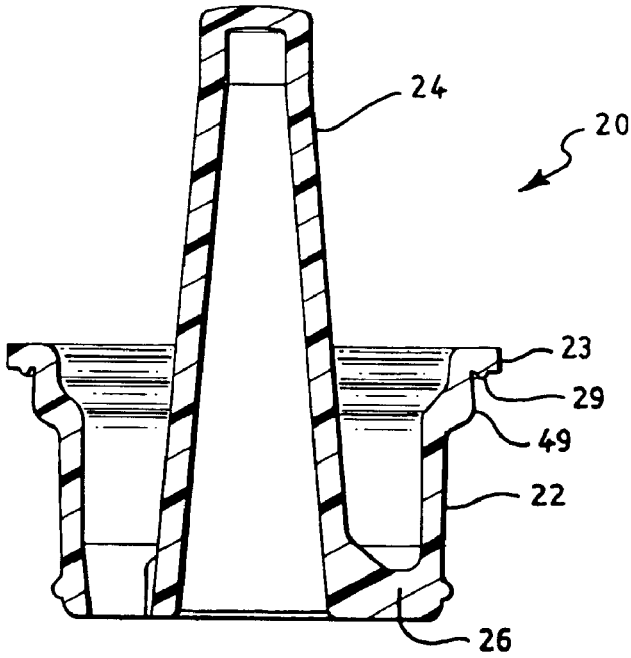
FIG. 7 is a sectional view of the fitment of FIG. 6 taken along line 7-7.
Figure 8:
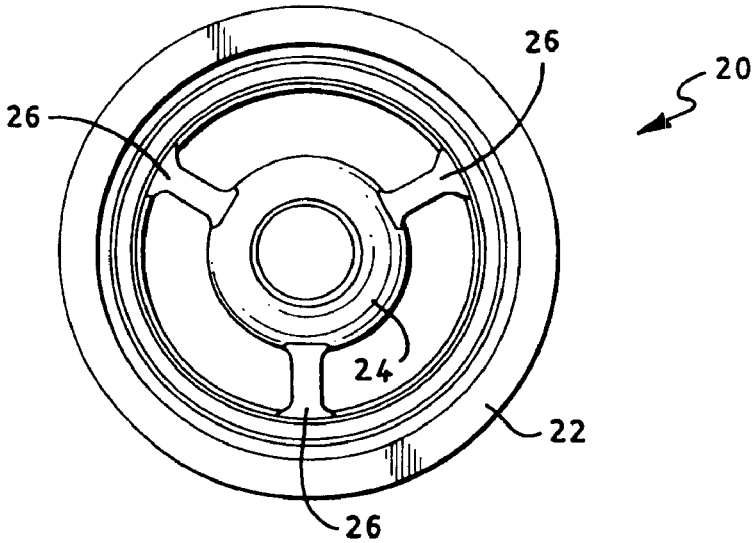
FIG. 8 is a bottom view of the fitment of FIG. 6.

*As shown in FIGS. 6-8, in addition to annular wall 22, fitment 20 includes a post 24 connected to annular wall 22 by a plurality of spokes 26. Post 24 is centrally aligned within the fitment 20 such that, when annular wall 22 engages skirt 64, post 24 extends through both opening 62 and spout portion 66. When cap body 50 is in the closed position, post 24 extends through opening 63 of spout portion 66, as shown in FIG. 4. Whereas, when cap body 50 is in the open position, post 24 extends through only a portion of spout portion 66 and extends short of opening 63. Annular wall 22 includes a locking bead 49 formed therein, as well as flange 23 projecting therefrom. Flange 23 includes a fitment sealing bead 29 formed thereon. When the closure 10 is assembled, fitment 20 is disposed within opening 84 of container finish 80, shown in FIG. 9. Fitment 20 is secured within opening 84 by the engagement of locking bead 49 with the inner surface of neck portion 82. Thus, as cap body 50 is threadably opened, fitment 20 remains secured in position relative to neck portion 82.*

As shown in FIG. 4, the cap body 50 and the fitment 20 cooperate to provide a double sealing mechanism, which includes the top wall sealing bead 51, flange 23, annular wall 22 and skirt sealing bead 65. A first seal is provided by the engagement of skirt sealing bead 65 contacting annular wall 22, as shown in FIG. 4. Skirt sealing bead 65 is disposed so as to sealably engage annular wall 22 throughout the range of axial rotation through which the cap body 50 may rotate. The first seal formed by skirt sealing bead 65 and annular wall 22 prevents the contents of the container (not shown) from leaking past skirt 64. A second seal is formed by the engagement of top wall sealing bead 51 and flange 23, as shown in FIG. 4. This second seal is forced only when the cap body 50 is in a generally closed position, since top wall 58 must be adjacent to flange 23 in order for top wall sealing bead 51 to engage flange 23. The second seal provides leakage protection that is in addition to the protection offered by the first seal, which is maintained throughout all the various orientations of the closure 10. In addition to the sealing mechanism provided by the cooperation of cap body 50 and fitment 20, a third seal is provided by the cooperation between fitment 20 and container finish 80. More particularly, when fitment 20 is disposed in the opening 84 of the container finish 80, fitment sealing bead 29 engages the upper surface 88 of neck portion 82, thereby forming the third seal. This third seal prevents the contents of the container (not shown) from leaking through opening 84 and past fitment 20.

As shown in FIGS. 2 and 4, outer wall 60 may include a thumb pad 68 disposed on an outer surface thereof. In a preferred embodiment, outer wall 60 is formed of an appropriate polymeric material and thickness as to make it deformable. A cap body 50 including a deformable outer wall 60 may include two thumb pads 68 diametrically aligned thereon. Outer wall 60 may be deformable by the application of pressure by the user to the points on the outer wall 60 where the thumb pads 68 are disposed so as to cause outer wall 60 to deform inwardly at those points, while also deforming outwardly at points approximately 90° away from those points. In such a preferred embodiment, child-resistant locks 61 and 63a are disposed approximately 90° away from thumb pads 68 along outer wall 60, so that, when outer wall 60 is deformed as described above, child-resistant locks 61 and 63a are moved away from child-resistant stops 81 and 83, shown in FIGS. 9-12, disposed on container finish 80, and prevent counterclockwise rotation and subsequent removal of the closure 10.

As shown in FIGS. 9-12, the container finish 80 includes a neck portion 82 with an opening 84 therein, whereby the contents of the container (not shown) may be accessed. The neck portion 82 includes at least one thread 86 disposed thereon. The container finish 80 also includes at least one lug stop 90 disposed thereon. In a preferred embodiment, the container finish 80 includes two lug stops 90 and 92 formed on a shoulder portion 94 of the container finish. Lug stop 90 is diametrically aligned with lug stop 92 along the outer surface of neck portion 82. However, depending on the desired range of rotation of the cap body 50 about the container finish 80, the container finish 80 of the present invention may include one or more lug stops that are disposed at various points around the container finish 80. As discussed herein below, the lug stops 90 and 92 engage drop lugs 54 and 56 in order to limit the range of rotation of the cap body 50 about the container finish 80.

Figure 9:
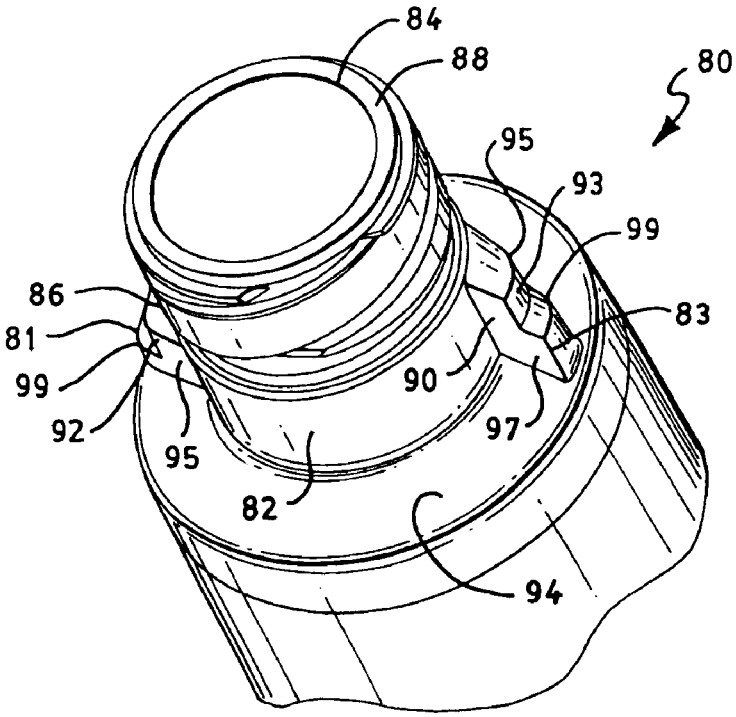
FIG. 9 is a perspective view of the container finish of the closure of the present invention.
Figure 10:
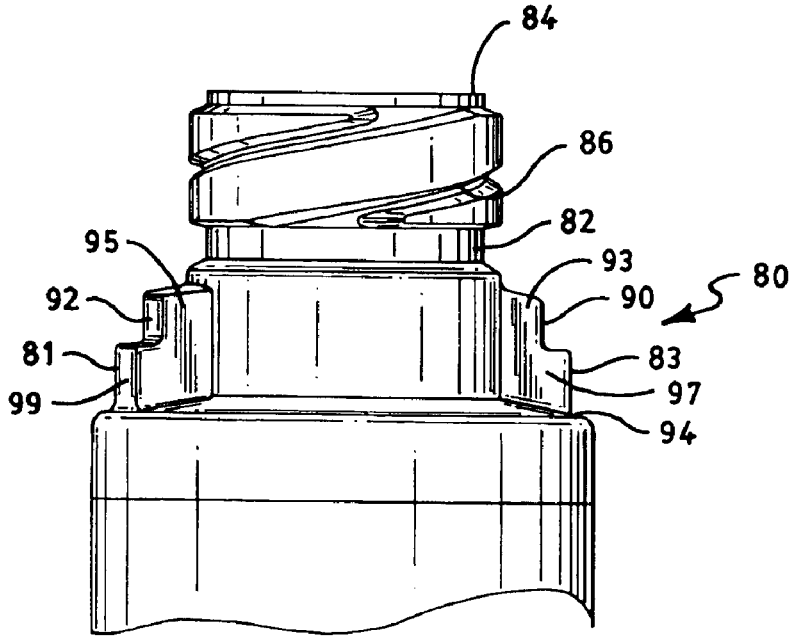
FIG. 10 is a side view of container finish of FIG. 9.
Figure 11:
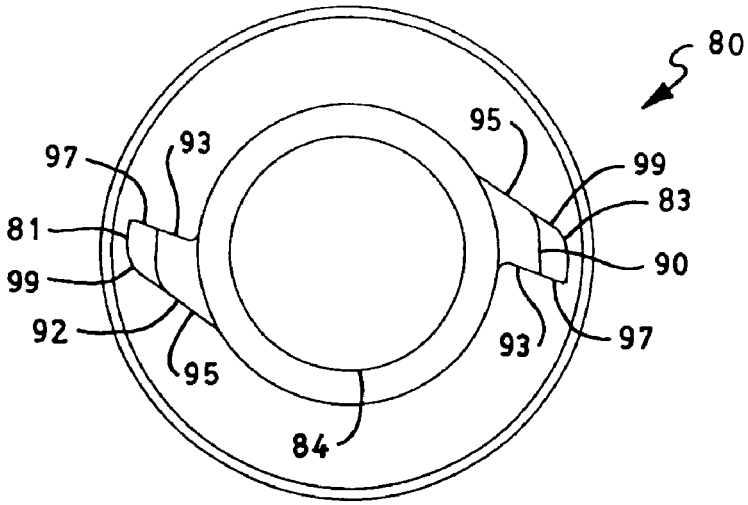
FIG. 11 is a top view of the container finish of FIG. 9.
Figure 12:
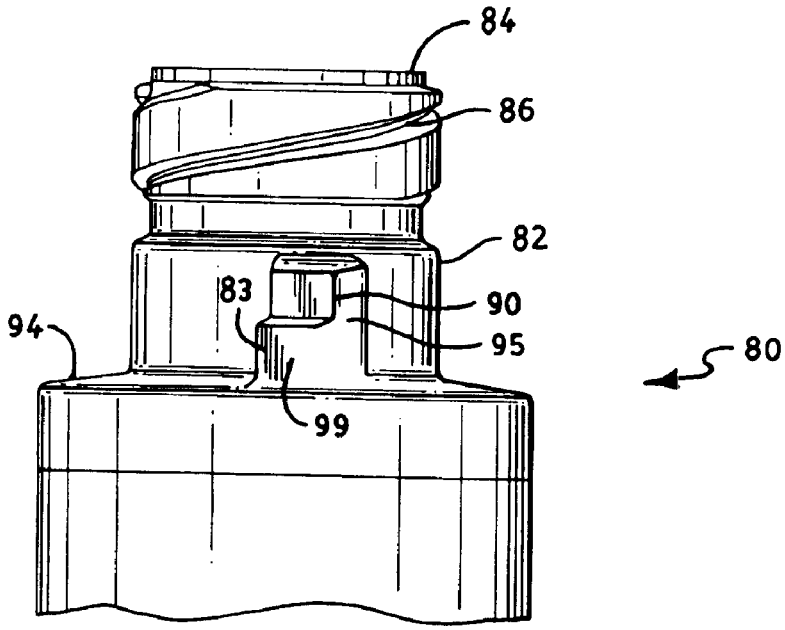
FIG. 12 is another side view of the container finish of FIG. 9.

Container finish 80 also may include at least one child-resistant stop 81 and/or 83. In one embodiment, container finish 80 includes two child-resistant stops 81 and 83 diametrically aligned around the neck portion 82 and integrally formed with lug stops 90 and 92, as shown in FIGS. 9 and 10. However, the closure 10 of the present invention also encompasses child-resistant stops that are not aligned nor integrally formed with lug stops 90 and 92. Child-resistant stops 81 and 83 cooperate with child-resistant locks 61 and 63a so as to limit the user's ability to open the closure 10, as discussed herein below. Child-resistant stops 81 and 83 differ from lug stops 90 and 92 in their size and positioning. More particularly, child-resistant stops 81 and 83 are smaller than lug stops 90 and 92 and are positioned radially beyond lug stops 90 and 92. The size and positioning of child-resistant stops 81 and 83 facilitate the proper opening of the closure 10 and allow for the lug stops 90 and 92 to engage drop lugs 54 and 56 even when outer wall 60 is being deformed so as to avoid the engagement of child-resistant stops 81 and 83 by child-resistant locks 61 and 63a. As shown in FIG. 11, each of the lug stops 90 and 92 and child-resistant stops 81 and 83 may include a generally flat side and a generally rounded side. More particularly, each of lug stops 90 and 92 may include a flat side or stop surface 93, as well as a rounded side or cam surface 95. Likewise, each of the child-resistant stops 81 and 83 may also include a flat or stop surface 97, as well as a rounded or cam surface 99. The stop surfaces 93 of lug stops 90 may engage drop lugs 56 and 54 so as to stop the axial rotation of cap body 50 about neck portion 82. However, when cam surfaces 95 of lug stops 90 and 92 engages drop lugs 56 and 54, the rounded surfaces of cam surfaces 95 allow the drop lugs 54 and 56 to slide over lug stops 90 and 92, so as to allow for the initial attachment of cap body 50 to container finish 80. Likewise, the stop surfaces 97 of child-resistant stops 81 and 83 engage child-resistant locks 61 and 63a on outer wall 60 of cap body 50, so as to prevent opening of the closure 10. Whereas, the cam surfaces 99 of child-resistant stops 81 and 83, when engaged, allow for the child-resistant locks 61 and 63a to slide over the child-resistant stops 81 and 83.

As shown in FIG. 5, drop lugs 54 and 56 are disposed approximately 90° away from each of child-resistant locks 61 and 63a, so that cap body 50 may be threadably rotated only approximately 90° about the container finish 80 before either a drop lug or a child-resistant lock engages a lug stop or a child-resistant stop. In this manner, the range of rotation of the cap body 50 about the container finish 50 is limited to approximately 90°. However, the present invention may include lugs, locks, and stops that are aligned differently so as to provide a varied range of rotation.

Figure 13:
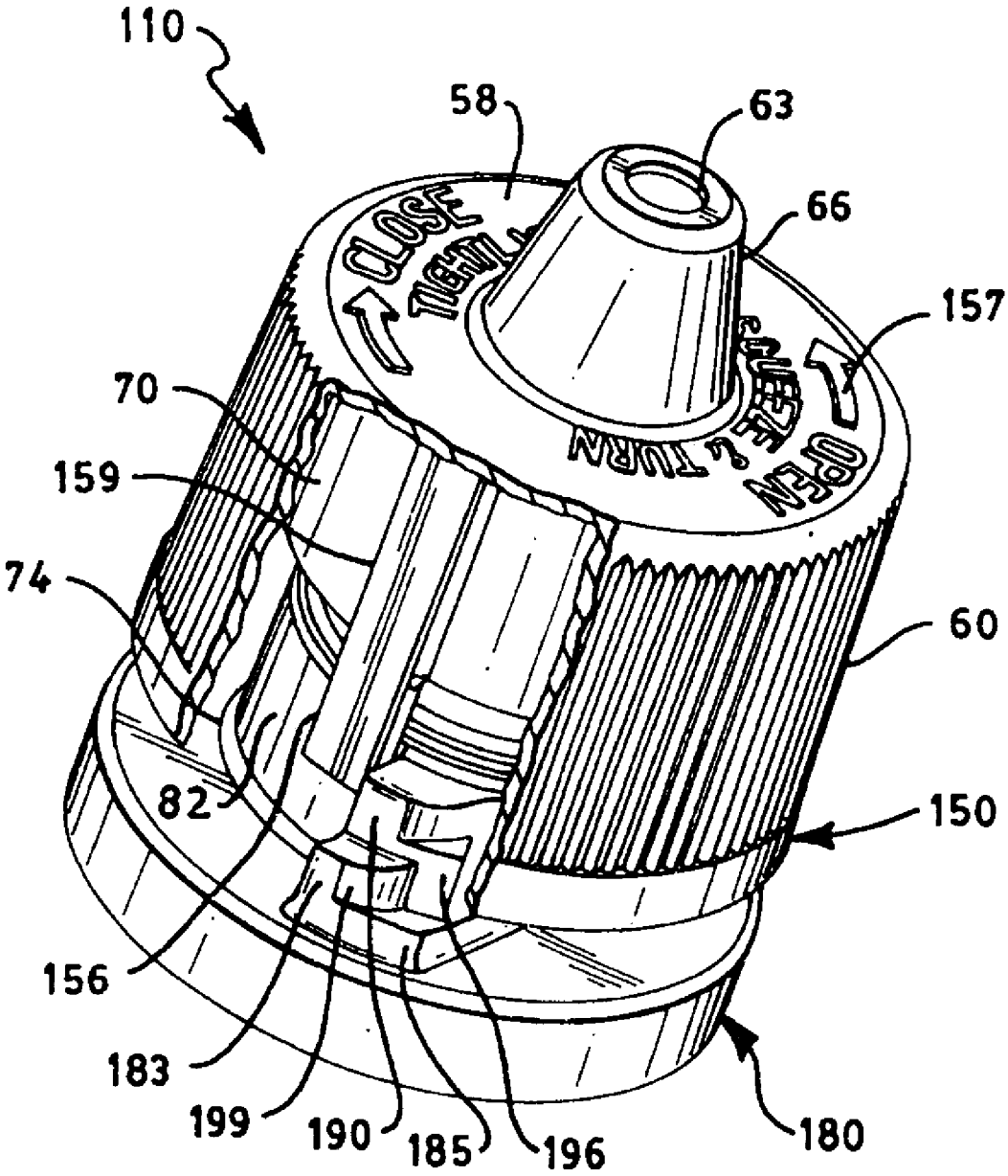
FIG. 13 is an alternative embodiment of the closure of the present invention with portions cut away.

As shown in FIG. 13, an alternative embodiment of the closure 110 is provided with at least one drop lug 156 having a reinforcing spine 159 projecting from inner wall 70. The reinforcing spine 159 provides further rigidity to drop lug 156 so that the lug does not deform as it engages lug stop 190. This alternative embodiment of the closure 110 also includes a lug stop 190 having a child-resistant stop 183 integrally formed therewith. Additionally, a cam 185 is also integrally formed with the child-resistant stop 183 so as to guide child-resistant lock 61 over the cam 199 of child-resistant stop 183. The dispenser closure 110 also includes an over-torque barrier 196 integrally formed with the stop 190. When cap body 150 is being threadably attached to container finish 180, over-torque barrier 196 engages drop lug 156 so as to prevent cap body 150 from being threaded too far onto the container finish 180. Over-torque barrier 196 also provides for the proper positioning of drop lugs 54 and 56 relative to lug stops 90 and 92 so that they may function properly.

In use, the closure 10 provides for the dispensing of the contents of a container (not shown). When closure 10 is assembled, fitment 20 is disposed over the opening 84 in the neck portion 82 of container finish 80. Cap body 50 is positioned over fitment 20 so that post 24 extends through spout portion 66 and seal 65 engages a surface of annular wall 22 of fitment 20. Cap body 50 is threadably attached to container finish 80 by the cooperation of at least one thread 72, on the inner surface 71 of inner wall 70, with at least one thread 86 on neck portion 82. Each of the drop lugs 54 and 56 and the child-resistant locks 61 and 63a are disposed between lug stops 90 and 92 and child-resistant stops 81 and 83. In the closed position, cap body 50 is threaded axially down over neck portion 82, such that post 24 of fitment 20 extends upward through each of opening 62, spout portion 66 and opening 63, thereby sealing opening 63 and the closure 10. When closure 10 is opened, the user applies inward pressure to the outer wall 60 at the thumb pads 68, thereby deforming the outer wall 60. The child-resistant locks 61 and 63a are disposed on the portions of the outer wall that deflect outward, when pressure is applied by the user. While this pressure is being applied, the user may then axially rotate the cap body 50, so that the cap body 50 moves upward from neck portion 82 and fitment 20. As the cap body 50 rotates axially, child-resistant locks 61 and 63a rotate past child-resistant stops 81 and 83 without engaging them, since the outer wall 60 is deformed outwardly at those points where the child-resistant locks are located. If the outer wall 60 was not deformed as the axial rotation was occurring, then child-resistant locks 61 and 63a would engage child-resistant stops 81 and 83, thereby preventing the opening of the closure 10. Nevertheless, as the child-resistant locks 61 and 63a on the deformed cap body 60 move past the child-resistant stops 81 and 83, the cap body 50 continues to rotate axially until one or both drop plugs 54 and 56 engage one or both stops 90 and 92. Once drop lugs 54 and 56 engage stops 90 and 92, further axial rotation of cap body 50 is prevented. At the point of engagement of drop lugs 54 and 56 with stops 90 and 92, closure 10 is open, but cap body 50 is still attached to container finish 80. In this manner, the dispenser closure 10 may dispense the contents of a container in which the closure 10 is attached without removing the cap body 50 from the container finish 80.

The foregoing detailed description is given primarily for clearness of understanding and no unnecessary limitations are to be understood therefrom for modifications will become obvious to those skilled in the art upon reading this disclosure and made without departing from the spirit of the invention or the scope of the invention.

What is claimed is:

1. A dispenser closure comprising:

a container finish having at least one thread and at least one lug stop formed thereon; and, a cap body threadably attached to said container finish, said cap body having a top wall with an opening therein, said top wall including an inner wall and an outer wall depending therefrom, said outer wall and said inner wall being concentrically aligned, said inner wall having at least one drop lug projecting from a terminating edge thereof;

said outer wall including at least one child-resistant lock formed therefrom, said container finish including at least one child-resistant stop formed thereon;

said child-resistant stop being integrally formed with said lug stop.

2. A dispenser closure comprising:

a container finish having at least one thread and at least one lug stop formed thereon; and, a cap body threadably attached to said container finish, said cap body having a top wall with an opening therein, said top wall including an inner wall and an outer wall depending therefrom, said outer wall and said inner wall being concentrically aligned, said inner wall having at least one drop lug projecting from a terminating edge thereof;

said outer wall including at least one child-resistant lock formed therefrom, said container finish including at least one child-resistant stop formed thereon;

said at least one lug stop including an over-torque barrier integrally formed therewith.

3. A dispenser closure comprising:

a container finish including at least one lug stop and at least one child-resistant stop formed thereon; and, a cap body threadably attached to said container finish, said cap body including a top wall with an inner wall and outer wall depending therefrom, said inner wall having at least one drop lug projecting downward therefrom, said outer wall including at least one child-resistant lock projecting therefrom;

said lug stop being integrally formed with said child-resistant stop.

4. A dispenser closure comprising:

a container finish including a neck portion and at least one lug stop integrally formed with at least one child-resistant stop formed on said neck portion; and, a cap body attached to said container finish, an inner wall and an outer wall projecting from a top wall of said cap body, said inner wall including at least one drop lug formed thereon, and said outer wall including at least one child-resistant stop formed thereon.

5. The dispenser closure of claim 4, further comprising a fitment attached to said container finish and sealably engaged to said cap body.

6. The dispenser closure of claim 5, said cap body further including a skirt depending from said top wall, said skirt including a sealing bead formed thereon, said sealing bead engaging said fitment.

7. The dispenser closure of claim 4, said at least one drop lug projecting downwardly from a terminating edge of said inner wall.

8. The dispenser closure of claim 4, said at least one drop lug including two drop lugs projecting from said inner wall, said at least one child-resistant lock including two child-resistant locks projecting from said outer wall.

9. The dispenser closure of claim 4, said at least one lug stop including an over-torque barrier integrally formed therewith.

10. The dispenser closure of claim 4, said at least one child-resistant stop including at least one cam formed integrally therewith.

* * * * *